United States Patent [19]

Shaw et al.

[11] 4,167,120
[45] Sep. 11, 1979

[54] SURFACE ACOUSTIC WAVE BRIDGE FOR ROTATION MEASUREMENT

[75] Inventors: Herbert J. Shaw, Stanford, Calif.; Jacques Souquet, Cagnes-sur-Mer, France; Christopher M. Fortunko, Thousand Oaks, Calif.

[73] Assignee: The United States of America as represented by the Secretary of the Navy, Washington, D.C.

[21] Appl. No.: 906,909

[22] Filed: May 18, 1978

[51] Int. Cl.$^2$ .............................................. G01P 3/44
[52] U.S. Cl. ...................................................... 73/505
[58] Field of Search .................. 73/505, 504, 596, 602, 73/640

[56] References Cited

U.S. PATENT DOCUMENTS

| 3,879,673 | 4/1975 | Shaw | 330/5.5 |
|---|---|---|---|
| 3,905,235 | 9/1975 | Shaw | 73/505 |
| 3,909,710 | 9/1975 | Newburgh et al. | 73/505 |
| 3,910,373 | 10/1975 | Newburgh et al. | 73/505 |
| 4,061,040 | 12/1977 | Shaw | 73/505 |

OTHER PUBLICATIONS

Newburgh et al., "Acoustic of Magnetic Surface Wave Ring Interferometers for Rotation Rate Sensing", IEEE 12/74.

Primary Examiner—Anthony V. Ciarlante
Attorney, Agent, or Firm—R. S. Sciascia; Charles D. B. Curry; Francis I. Gray

[57] ABSTRACT

A surface acoustic wave bridge for rotation measurement which uses acoustic waves propagated in opposite directions about the circumference of a rotor. The acoustic waves are generated by a transducer adjacent the rotor which is excited by an rf electric field. Clockwise and counterclockwise waves in the surface of the rotor interfere with each other adjacent the transducer to form a bridge system which produces a null when the waves are out of phase. The rf frequency of the electric field is varied to obtain the null and, thus, is a measurement of the rotation rate of the rotor.

For the measurement of slow rotation rates two transducers are used to generate the counterrotating acoustic waves in a helical pattern such that the acoustic wave generated by one transducer is received by the other. The outputs of the transducers are detected and provide an approximately linear measurement of slow rotational rates.

10 Claims, 5 Drawing Figures

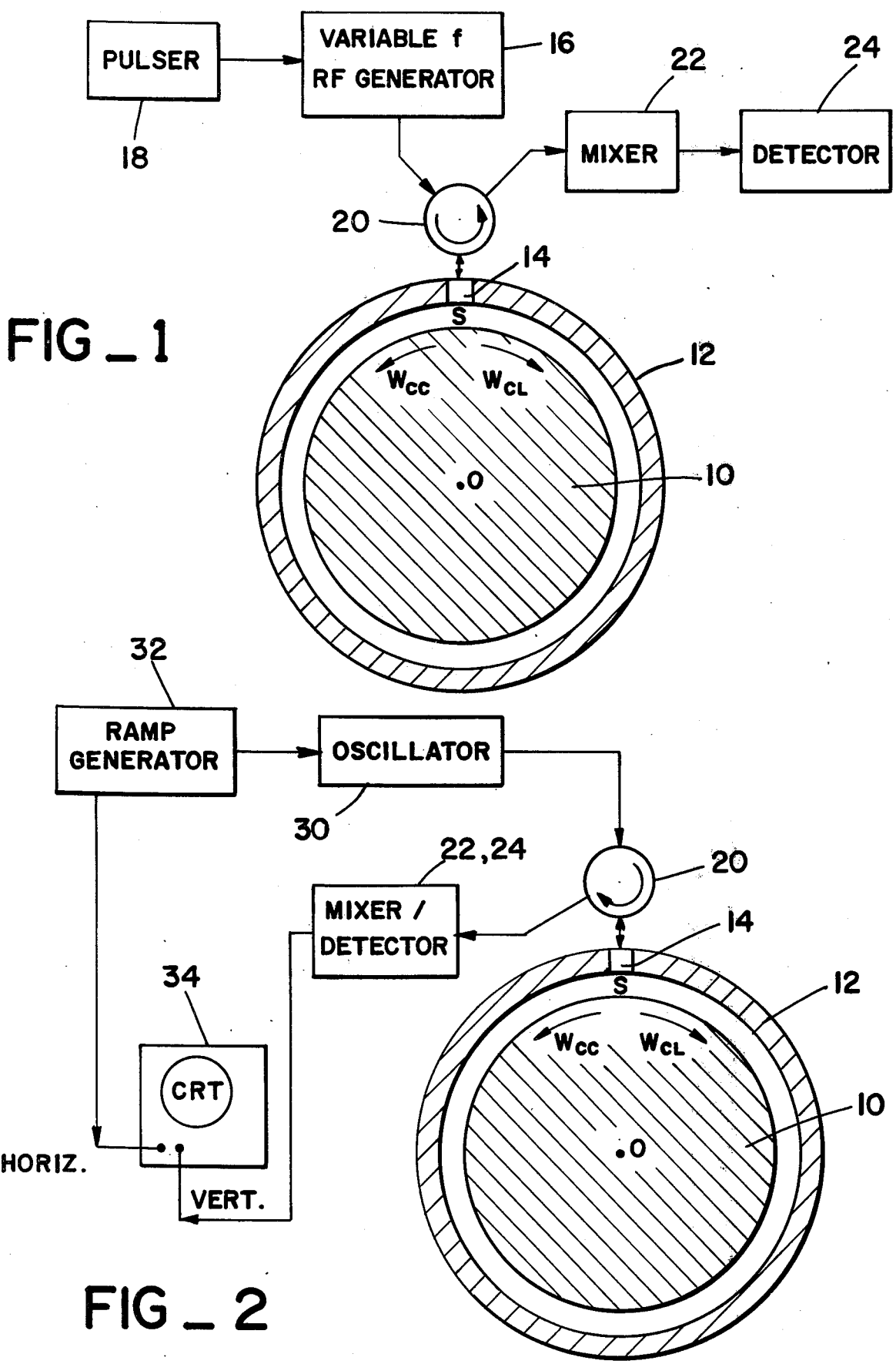

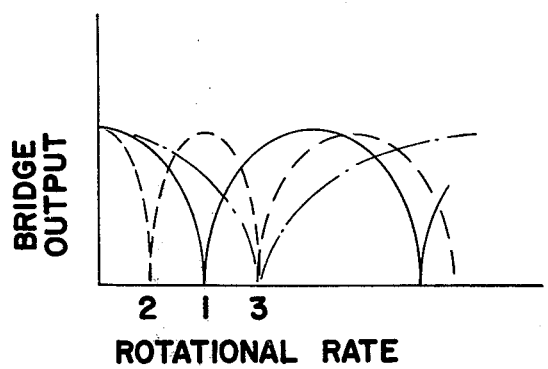
FIG_3
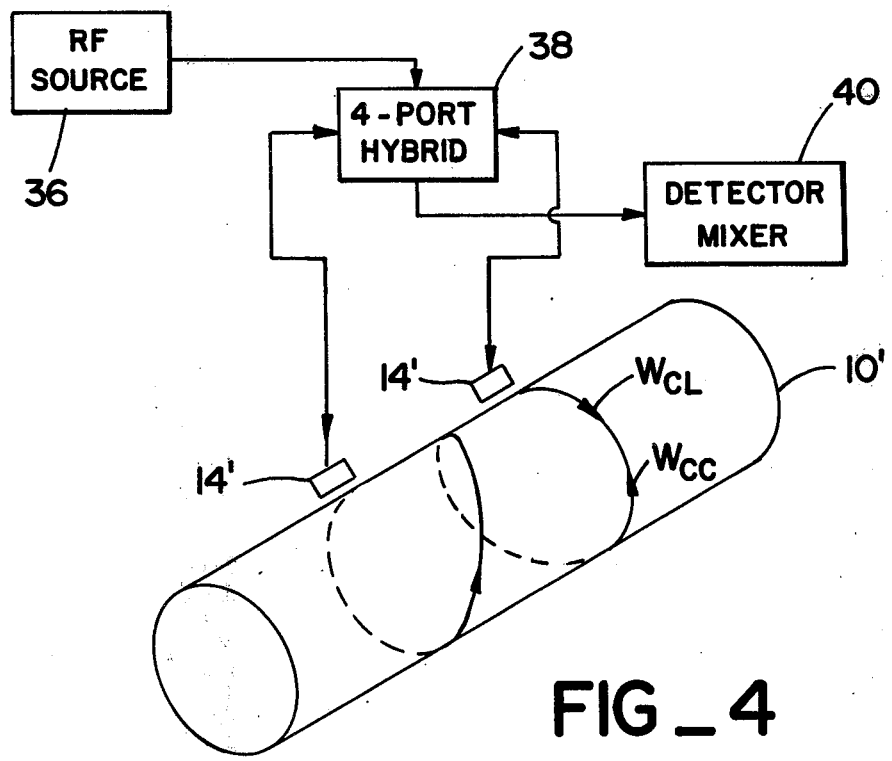
FIG_4
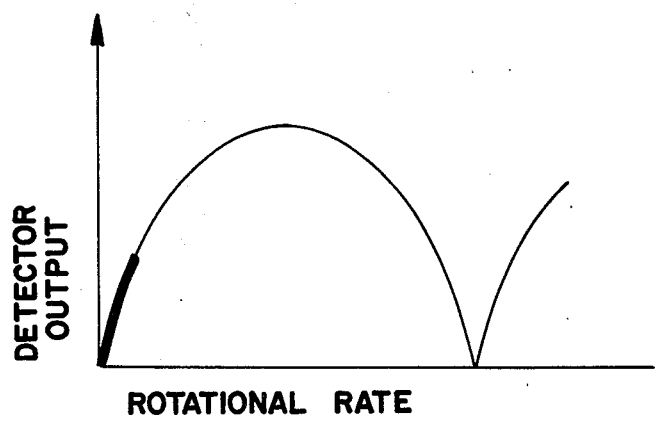
FIG_5

SURFACE ACOUSTIC WAVE BRIDGE FOR ROTATION MEASUREMENT

BACKGROUND OF THE INVENTION

1. Field of the Invention

The present invention relates to measurement of rotation rates of a rotor, and more particularly to the phase interference of counterrotating acoustic waves as a measure of rotation rates.

2. Description of the Prior Art

For very accurate rotation measurements, such as in gyroscopes, previous devices used some sort of marking of the surface of the rotor. The marking could be either visual or a distortion of the rotor surface which would be detected, as by a capacitor pickup. The distortion introduced a perturbation to the rotor which created errors in the functioning of the device.

Acoustic waves, being slow compared to electromagnetic waves, can experience greater velocity perturbations due to the velocity being close to that of the rotor surface linear velocity, and eliminate the requirement of marking the rotor with the resulting perturbation.

SUMMARY OF THE INVENTION

Accordingly, the present invention provides a surface acoustic wave bridge which uses the phase difference between counterrotating acoustic waves in the surface of a rotor to measure rotation of the rotor. A transducer adjacent the surface of the rotor is excited by an rf electric field to produce the counterrotating acoustic waves. When the rotor is rotating, the counterrotating waves can be brought into phase opposition when they arrive adjacent the transducer. This is accomplished by varying the frequency of the rf electric field. The counterrotating waves thus form a bridge system with the frequency of the rf electric field as a measure of the rotation rate of the rotor.

For slow rotation rates down to zero two transducers adjacent the rotor and spaced longitudinally apart are oriented to produce the counterrotating acoustic waves along a helical path such that the acoustic wave generated by one transducer is received by the other transducer. The transducers are excited from a single rf source through a four-port hybird junction to produce symmetrical counterrotating acoutic waves. The received acoustic waves return from the transducers to the four-port hybird as rf signals which are sent to a detector. The output of the detector is a linear representation of the rotation rate for slow rotations.

Therefore, it is an object of the present invention to provide a device for measuring the rotation rate of a rotor by using surface acoustic waves.

Another object of the present invention is to provide a device for measuring slow rotation rates of a rotor down to zero velocity by using surface acoustic waves.

Other objects, advantages and novel features of the present invention will be apparent from the following detailed description of the invention when considered in conjunction with the accompanying drawing and claims.

BRIEF DESCRIPTION OF THE DRAWING

FIG. 1 is a block diagram of one embodiment of the present invention.

FIG. 2 is a block diagram of a second embodiment of the present invention.

FIG. 3 is a graph of the bridge output for the embodiment of FIG. 1 as a function of rf excitation frequency and rotational rate.

FIG. 4 is a perspective diagrammatic view of another embodiment of the present invention for slow rotational rates.

FIG. 5 is a graph of the detector output for the embodiment of FIG. 4 as a function of rotational rate for a given rf excitation frequency.

DESCRIPTION OF THE PREFERRED EMBODIMENTS

Referring now to FIG. 1 a rotor 10, in the form of a circular cylinder or sphere, rotates about an axis through point 0 perpendicular to the plane of the drawing. In the case of a cylindrical rotor, the rotor might be a rotating shaft or a cylindrical gyroscope rotor. In the case of a spherical rotor, the rotor might be a spherical gyroscope rotor. A housing 12 has a surface shaped to fit close to the surface of the rotor leaving a small spacing between the respective surfaces A surface acoustic wave transducer 14 is affixed to the surface of the housing 12 adjacent the rotor 10. The transducer 14 may be a standard interdigital transducer formed from thin film electrodes deposited on the surface of the housing 12. The transducer 14 is close to, but not touching, the surface of the rotor 10, being spaced from the surface of the rotor by a small spacing S. S is a function of the wavelength of the surface acoustic wave and is of the order of magnitude equal to or less than the acoustic wavelength. For example, for a 100 MHz acoustic wave S should be 1 mil or less.

The transducer 14 is energized with an rf signal from a variable frequency rf generator 16 which is pulsed by a pulser 18. The rf pulse is coupled to the transducer 14 by a circulating coupler 20. If the surface of the rotor 10 is piezoelectric, surface acoustic waves can be excited by rf electric fields of the transducer 14 extending across S. The two waves are rf tone pulses whose length is shorter than the transit time of the waves once around the periphery of the rotor 10. The rf excitation of the transducer 14 produces two surface acoustic waves on the surface of the rotor 10, one of which, $W_{CL}$, propagates clockwise around the rotor while the other, $W_{CC}$, propagates counterclockwise. If the rotor 10 is stationary, both of these waves arrive back at the transducer 14 in the same phase and add constructively to produce an output signal in the transducer 14. If the rotor 10 rotates, in the clockwise direction for example, the transit time of $W_{CL}$ is decreased and the transit time of $W_{CC}$ is increased resulting in a phase displacement between the two waves when they arrive at the transducer 14. The paths of the two waves form a bridge system which can be balanced, i.e., have a null output at the transducer 14 when $W_{CL}$ and $W_{CC}$ are just out of phase on arrival at the transducer.

A mixer 22 beats the two waves of the output signal from the transducer 14 to provide an output proportional to cos $\Delta\phi$ where $\Delta\phi$ is the difference between $W_{CL}$ and $W_{CC}$ at the transducer 14. The output from the mixer 22 is detected by a detector 24 to determine when the bridge is nulled. The mixer 22 and detector 24 together form a phase detector.

The bridge will be balanced when $$\Delta\phi = \phi_1 - \phi_2 = \pi \qquad (1)$$

where $\phi_1$ and $\phi_2$ are the phases of $W_{CL}$ and $W_{CC}$ at the transducer 14.

Then $$\phi_1 = \frac{2\pi f}{v} \cdot \frac{\pi D}{1 + \frac{D\pi F}{v}} \tag{2}$$

and $$\phi_2 = \frac{2\pi f}{v} \cdot \frac{\pi D}{1 - \frac{D\pi F}{v}} \tag{3}$$

where f and v are the frequency and velocity of the surface acoustic waves, and F and D are the frequency of rotation and diameter of the rotor 10.

Thus $$\Delta\phi = 4\pi^3 \left(\frac{D}{vL}\right) Ff \tag{4}$$

where $$L = \sqrt{1 - \left(\frac{D\pi F}{v}\right)^2} \tag{5}$$

From equation (1) when the bridge is balanced $$Ff = \left(\frac{1}{2\pi}\right)\left(\frac{v}{D}\right)^2 L^2 \tag{6}$$

When the rotation velocity $\dot{\theta}(\dot{\theta}=2\pi F)$ of the rotor 10 is small, $L \simeq 1$ and equation (6) becomes $$Ff \simeq \left(\frac{1}{2\pi}\right)^2 \left(\frac{v}{D}\right)^2 \tag{7}$$

Thus, the conditions for balancing the bridge provide a measurement of the rotation rate of the rotor 10.

For typical orders of magnitude $v = 5 \times 10^5$ cm/sec and $D = 1$ cm. Then $$Ff = 6.34 \text{ MHzKHz} \tag{8}$$

If the rotation frequency F of the rotor 10 is 0.5 KHz (30,000 rpm), the rf frequency f for balancing the bridge is 12.68 MHz. In practice it is possible to go to rf frequencies well above 100 MHz, corresponding to rotation rates below 3800 rpm.

For lower rotation rates multiple transits of the surface acoustic waves can be used. Output signals from the bridge will be observed after N transits of the waves, where N is an integer whose maximum usable value depends upon the attenuation suffered by the waves when propagating in the material of the rotor 10.

For higher rotation rates higher order balance points of the bridge are used where $$\Delta\phi = (2M-1)\pi \tag{9}$$

where M is an integer.

Thus, for the general case equation (7) becomes $$Ff \simeq \left(\frac{1}{2\pi}\right)^2 \left(\frac{v}{D}\right)^2 \left(\frac{2M-1}{N}\right) \tag{10}$$

It is apparent from the above discussion that the frequency f of the rf generator 16 which balances the bridge is a measure of the rotation rate of the rotor 10.

Alternatively, as shown in FIG. 2 the transducer 14 may be excited by an rf oscillator 30, the frequency f of which is swept as a function of time by a ramp generator 32. The output of the bridge, applied to a display device 34, such as an oscilloscope, strip recorder or the like, will contain "fringes," i.e., closely spaced maxima and minima whose spacing in time is a measure of the rotation rate of the rotor 10.

For zero rotation rate of the rotor the counterrotating acoustic waves, $W_{CL}$ and $W_{CCL}$, add constructively and the bridge cannot be nulled. FIG. 3 shows the bridge output for three different rf frequencies, having nulls at points 1, 2 and 3, illustrating the constructive interference at zero rotational rate.

Therefore, it is desirable to look at each of the counterrotating waves, $W_{CL}$ and $W_{CC}$, individually. As shown in FIG. 4 the rotor 10', illustrated as cylindrical in shape, has two transducers 14' situated adjacent the surface of the rotor and spaced apart longitudinally. The transducers 14' are oriented to produce the counterrotating acoustic waves, $W_{CL}$ and $W_{CC}$, along a circulating helical path such that the acoustic wave generated by one transducer is received by the other transducer as described in U.S. Pat. No. 3,879,673 (Shaw) entitled CIRCULATING ACOUSTIC SURFACE WAVE.

The rf energy necessary to excite the transducers 14' is provided by an rf source 36 input to one port of a four-port hybrid junction 38. The two ports of the four-port hybrid junction 38 adjacent the input port are connected to the transducers 14'. The port opposite the input port of the junction 38 is the output port. A detector 40 is connected to the output port.

In operation rf energy from the source 36 is input to the junction 38 where it is split to energize the transducers 14' to produce the helically counterrotating acoustic waves, $W_{CL}$ and $W_{CC}$, in the surface of the rotor 10'. When the rotor 10' is stationary, i.e., rotational rate is zero, the two acoustic waves detected by the transducers 14' are in phase and the electrical energy returns through the junction 38 to the source 36. Thus, there is no output to the detector 40 from the junction 38 when the rotor 10' is stationary. As shown in FIG. 5 the output of the detector 40 is in the form of a rectified sine wave as a function of rotational rate. For slow rates the initial slope of the output is linear, and the frequency of the source 36 can be adjusted for best linearity of output for the slow rotational rates to be detected.

Thus, the present invention provides a bridge system for determining the rotation rate of a rotor without the use of surface marking or deformations of the rotor surface by using counterrotating surface acoustic waves. Also, for slow rotational rates a linear correlation of output to rotational rate is provided by the counterrotating surface acoustic waves.

What is claimed is:

1. An apparatus for measuring the rotation rate of a rotor comprising:
   (a) means fixed adjacent to said rotor for generating counterrotating surface acoustic waves on said rotor;
   (b) means for detecting the phase difference between said counterrotating surface acoustic waves resulting from the rotation rate of said rotor relative to said generating means; and
   (c) means for varying said phase difference.

2. The rotation rate measuring apparatus as recited in claim 1 wherein said generating means comprises:
   (a) a first surface acoustic wave transducer situated adjacent the surface of said rotor such that said counterrotating surface acoustic waves are propagated on said rotor when said transducer is energized; and (b) means for energizing said transducer.

3. The rotation rate measuring apparatus as recited in claim 2 wherein said energizing means comprises:

an rf source; and (b) a pulser connected to said rf source such that the output of said rf source produces said counterrotating acoustic waves as rf tone pulses with a pulse length shorter than the transit time of said counterrotating surface acoustic waves around the periphery of said rotor.

4. The rotation rate measuring apparatus as recited in claim 3 wherein said varying means comprises means for adjusting the frequency of said rf source to obtain a null output from said detecting means, the frequency at which said null output occurs being a measure of the rotation rate of said rotor.

5. The rotation rate measuring apparatus as recited in claim 4 wherein said detecting means comprises a phase detector connected to said first transducer to determine the existence of said null output.

6. The rotation rate measuring apparatus as recited in claim 2 wherein said energizing means comprises:

(a) an rf source; and (b) a ramp generator connected to said rf source to vary the frequency of said rf source linearly as a function of time, said ramp generator providing said varying means to produce spaced maxima and minima at the output of said detecting means.

7. The rotation rate measuring apparatus as recited in claim 6 wherein said detecting means further comprises a display device connected to said phase detector to display the output of said phase detector as a function of time, said display device being synchronized with the output of said ramp generator.

8. A rotation rate measuring apparatus as recited in claim 2 wherein said generating means further comprises a second surface acoustic wave transducer situated adjacent the surface of said rotor and connected to said energizing means, said first and second transducers being oriented relative to each other such that said counterrotating surface acoustic waves propagated on the surface of said rotor describe a helical path between said transducers, the clockwise surface acoustic wave propagated by said first transducer being received by said second transducer and the counterclockwise surface acoustic wave propagated by said second transducer being received by said first transducer.

9. A rotation rate measuring apparatus as recited in claim 8 wherein said detecting means comprises a phase detector connected to said first and second transducers.

10. The rotation rate measuring apparatus as recited in claim 9 wherein said varying means comprises:

(a) an rf source to energize said first and second transducers; and (b) means for adjusting the frequency of said rf source such that for slow rotation rates the output of said phase detector is approximately linearly proportional to the rotation rate of said rotor.

* * * * *